(12) United States Patent
Brown et al.

(10) Patent No.: US 8,419,589 B1
(45) Date of Patent: Apr. 16, 2013

(54) LOCKED CONTACT INFINITELY VARIABLE TRANSMISSION

(76) Inventors: Lawrence George Brown, Nassau (BS); Gregory A M Brown, Alamo, CA (US); Brian Alexander Brown, Alamo, CA (US)

(*) Notice: Subject to any disclaimer, the term of this patent is extended or adjusted under 35 U.S.C. 154(b) by 407 days.

(21) Appl. No.: 12/475,277

(22) Filed: May 29, 2009

Related U.S. Application Data

(60) Provisional application No. 61/132,507, filed on Jun. 20, 2008.

(51) Int. Cl.
*F16H 15/00* (2006.01)

(52) U.S. Cl.
USPC ............... 476/48; 476/57; 476/61; 476/72

(58) Field of Classification Search ......... 476/48, 476/56, 57, 58, 61, 72, 73; 192/103 B, 105 CD, 192/45.1
See application file for complete search history.

(56) References Cited

U.S. PATENT DOCUMENTS

| | | | | | |
|---|---|---|---|---|---|
| 547,930 | A | * | 10/1895 | Marburg, Jr. | 192/105 CD |
| 800,334 | A | * | 9/1905 | Stevens | 476/57 |
| 2,194,228 | A | * | 3/1940 | Jex | 192/41 R |
| 2,473,250 | A | * | 6/1949 | Hoffman | 74/810.2 |
| 2,551,980 | A | * | 5/1951 | Tholl | 74/665 Q |
| 2,596,359 | A | * | 5/1952 | Bartlett | 476/62 |
| 2,599,793 | A | * | 6/1952 | Warner | 192/45.1 |
| 3,040,854 | A | * | 6/1962 | Rauh | 192/45.1 |
| 3,753,477 | A | * | 8/1973 | Cadet | 192/41 A |
| 4,224,840 | A | * | 9/1980 | Kraus | 476/9 |

\* cited by examiner

*Primary Examiner* — William C Joyce
(74) *Attorney, Agent, or Firm* — Fulbright & Jaworski L.L.P.

(57) ABSTRACT

An infinitely variable transmission, in which the driver and driven members can exchange their roles—with the driver becoming the driven, and vice versa. The initially chosen driver carries within it a number of movable parts, which the driving forces bring into contact with the driven member, in a manner designed to produce a momentary lock between the driver and driven members, at the point of the torque transfer between them. In one embodiment the driven member—which can be a flat disc—is clamped between two oppositely placed drivers. Infinite variability is achieved by controllably relocating the fixed diameter drivers to smaller or larger diameter points on the so clamped disc. The output can be harvested from the rotation of said driven disc directly. Or one or more driver members like these which are used to rotate said disc, can be brought into contact with different locations on said disc, and become driven by it. In such a case a number of different speeds, or torque levels, can be taken simultaneously as outputs from a single rpm/torque input. In embodiments with a single driver of convex shape input, the preferred driven member is a cone with a concave curvature, to allow for a larger contact zone than two opposing convex parts could provide. Either the flat clamped disc version, or the cone versions, can be stacked vertically or horizontally, with cones nested within each other, to multiply gear ratios and or torques as wished.

11 Claims, 7 Drawing Sheets

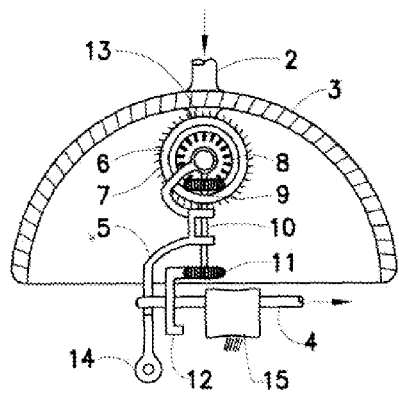
FIG. 5
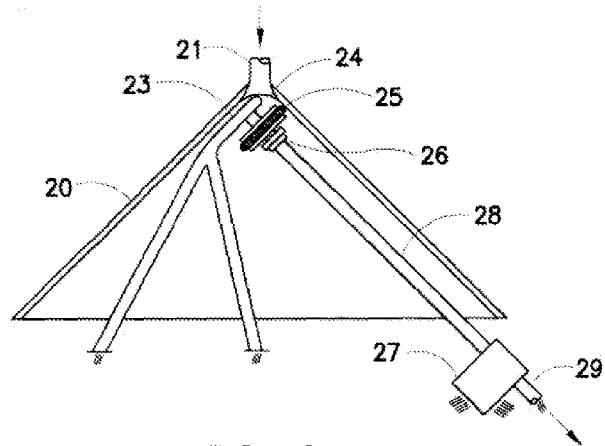
FIG. 6
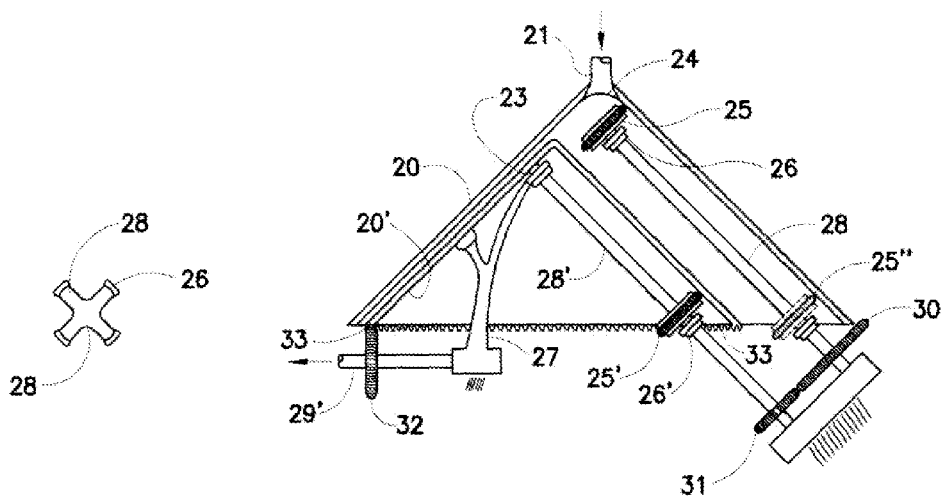
FIG. 7      FIG. 8

TTU LUG VERSION

TTU ROLLER ALTERNATE

OUR APPROACH

LOCKED CONTACT INFINITELY VARIABLE TRANSMISSION

CROSS REFERENCE TO RELATED APPLICATION

This patent issued from an application that claims priority of a Provisional Patent Application Ser. No. 61/132,507 filed on Jun. 20, 2008.

BACKGROUND

The first and simplest IVTs were rolling contact, friction driven; they were followed by belt driven variable pulleys. Millions of great variety of such transmissions are now in use. Their limitations are low efficiency, and inability to handle higher torques. This invention hopes to provide solutions in both these areas.

Figure 9A:
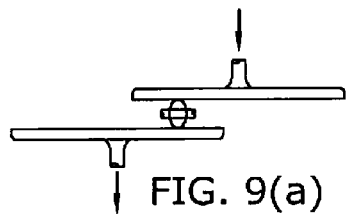
Figure 9B:
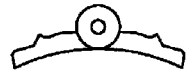
Figure 9C:
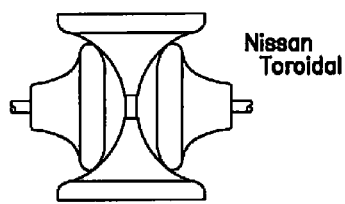
Figure 9D:
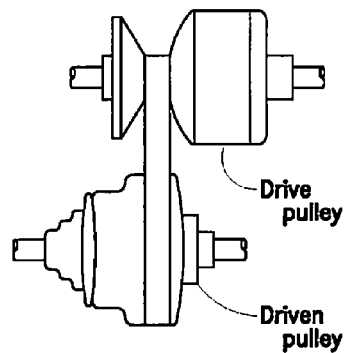
Figure 9E:
Figure 9G:
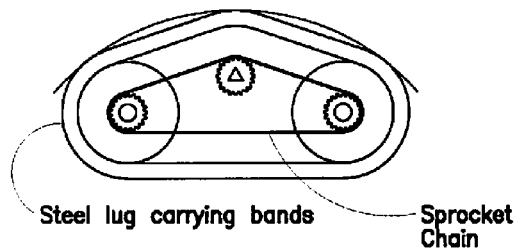

FIGS. 9(a)-9(d) illustrate how driving forces are now transmitted: FIG. 9(a) shows a most common force transfer—friction, thru a point contact—with the force between the drive/driver parts determined by the set distance between their shafts; FIG. 9(b) shows pulley to a convex surface—again friction thru a point contact; FIG. 9(c) is Nissan's toroidal—two contact points are used, but still using only preset force friction point' contact; FIG. 9(d) illustrates a typical variable v belt mechanism—a highly inefficient friction transfer. A Dutch made variant of the version shown in FIG. 9(d) has made it into automotive use, and for while a small Ford model many years ago also attempted to adapt such a transmission; all such tries failed.

Automotive transmissions are now as a rule not variable, using step (gear) changes, and can be quite bulky and expensive. Many varieties of "continuously variable" transmissions exist in design only, and more recently a number of infinitely variable ones utilizing a ratcheting function have also appeared.

ADVANTAGES

Figure 9F:
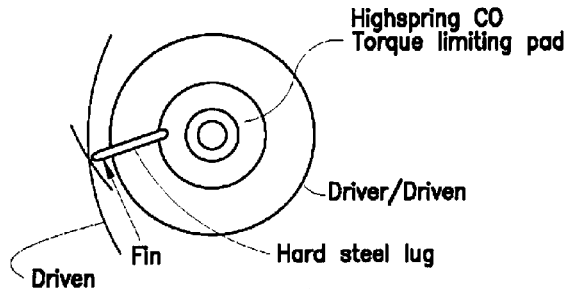
Figure 9H:
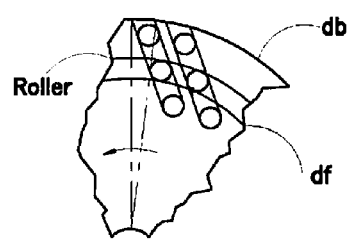

The prior art designs of FIGS. 9(a)-9(d) each differ from the embodiments of the present disclosure, which include improved contacts areas between the driven and driving surfaces. Our contact parts geometry and movement to seek momentary gripping and locking, with FIG. 9(f) illustrating one such principle. FIGS. 9(e), 9(f), 9(g), and 9(h) depict examples of the present geometries of driven/driver surfaces relationship, except—as shown below—when either the driver or driven member is a flat disc.

This invention creates a momentary "locked contact" between the driving and the driven elements, in which the two are momentarily locked, gripped together at the apex of the contact between them, creating an action akin to the interaction of two mated gears, while retaining a truly infinite gear (ratio) selection capability.

Compact, much lighter transmissions, providing a very large range of infinitely variable gearing are the result. More than one output rpm or torques, can be taken from a single input at the same time.

SUMMARY

Torque Transmitting Unit (TTU) is slideably placed on a shaft, and when the shaft rotates, the TTU transmits a rotation causing force to a disc it is in contact with; transmittal occurs thru an endless circular row of lugs, cantilevered within the TTU, so that they produce interference with the surface of the disc when the TTU rotates. In the embodiment where the disc is flat, it is gripped from both sides by the tilting lugs in the oppositely placed TTU's.

When a single TTU is used, the mating disc could be a cone, or a hemisphere, to provide a more friendly geometry for the gripping contact area.

Gear shifting is caused by sliding the TTU along the shaft, and so relocating the contact of the constant diameter TTU to different diameters of the disc, which results in varying the disc's output rotational speed.

The driver/driven relationship works both ways: TTU drives the disc, or the disc can drive the TTU, by sweeping the lugs into a wedging position. Thus tandem transmissions of one disc, and two shafts carrying TTU's are used, with driving TTU moving from the outer perimeter of the disc to nearly its center, and the TTU driven by the disc moving from center of the disc to the outer perimeter of it; that combination is capable producing very high gear ratios in a compact, light assembly.

Multiplications of this function can be achieved, by stacking discs and TTUs one above or next to another, and or by nesting a smaller cone within a larger one, achieving still higher ratios and or greater torque capabilities.

One disc, while receiving only a single input rpm, can be made to deliver—by adding shafts and TTUs—more than one different torque/rpm outputs at the same time.

DRAWINGS

Figure 1:
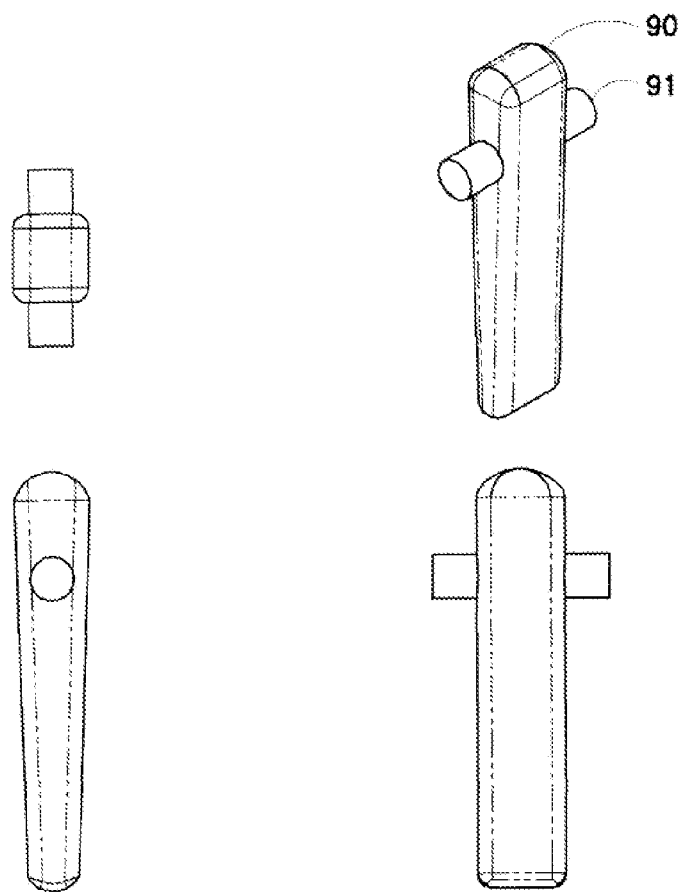
Figure 1A:
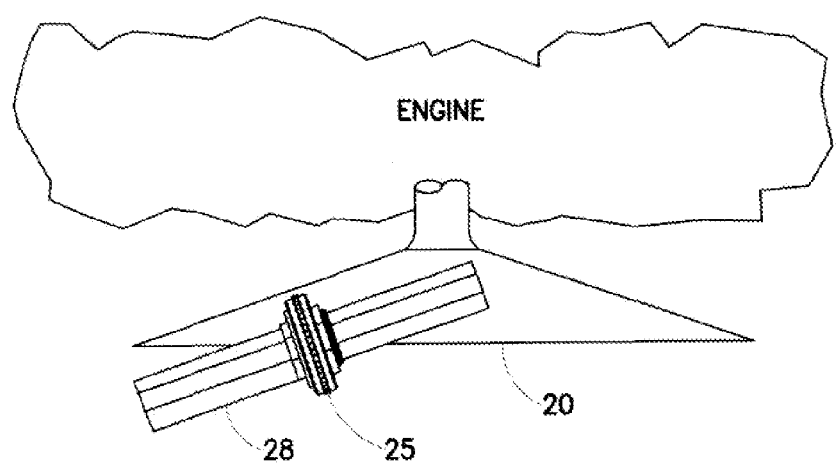
Figure 2:
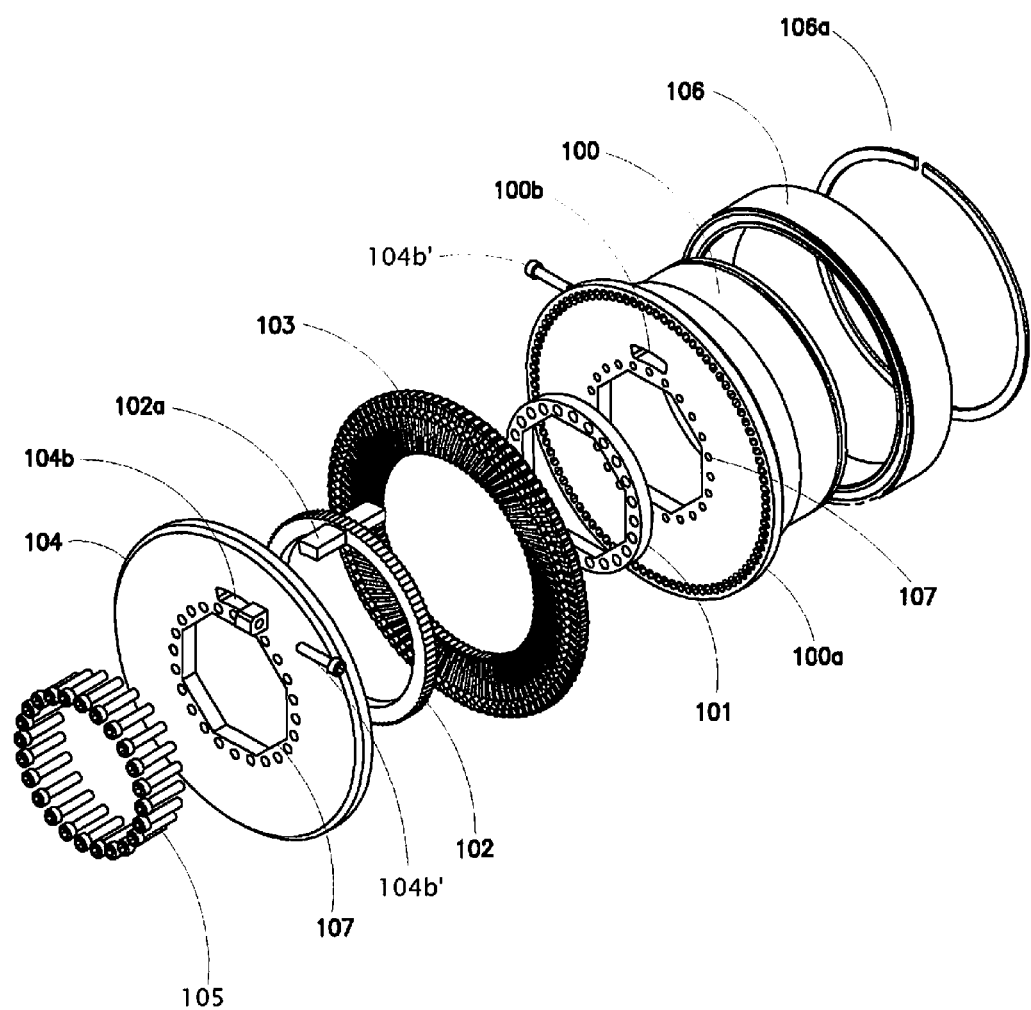
Figure 3:
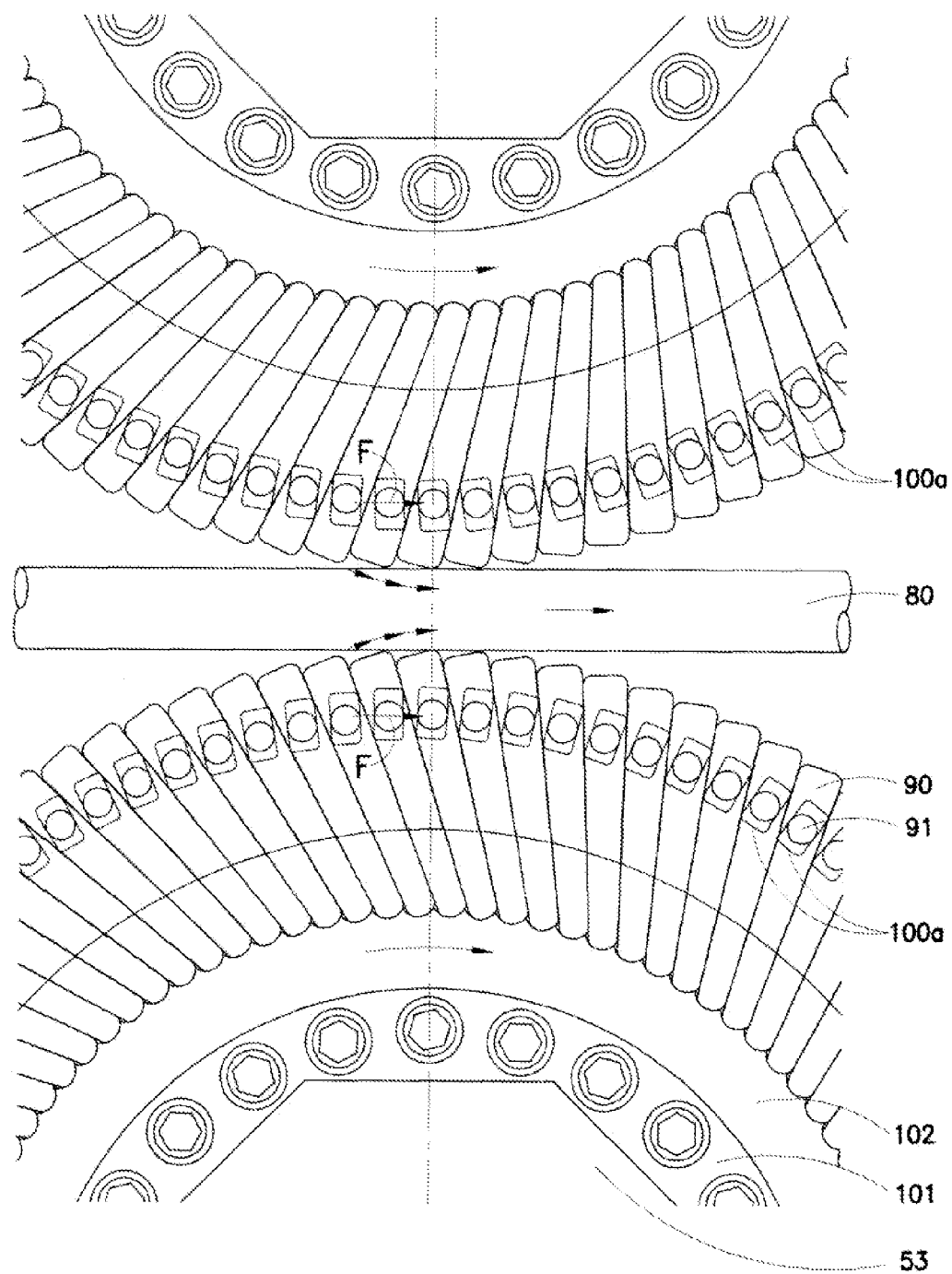
Figure 3A:
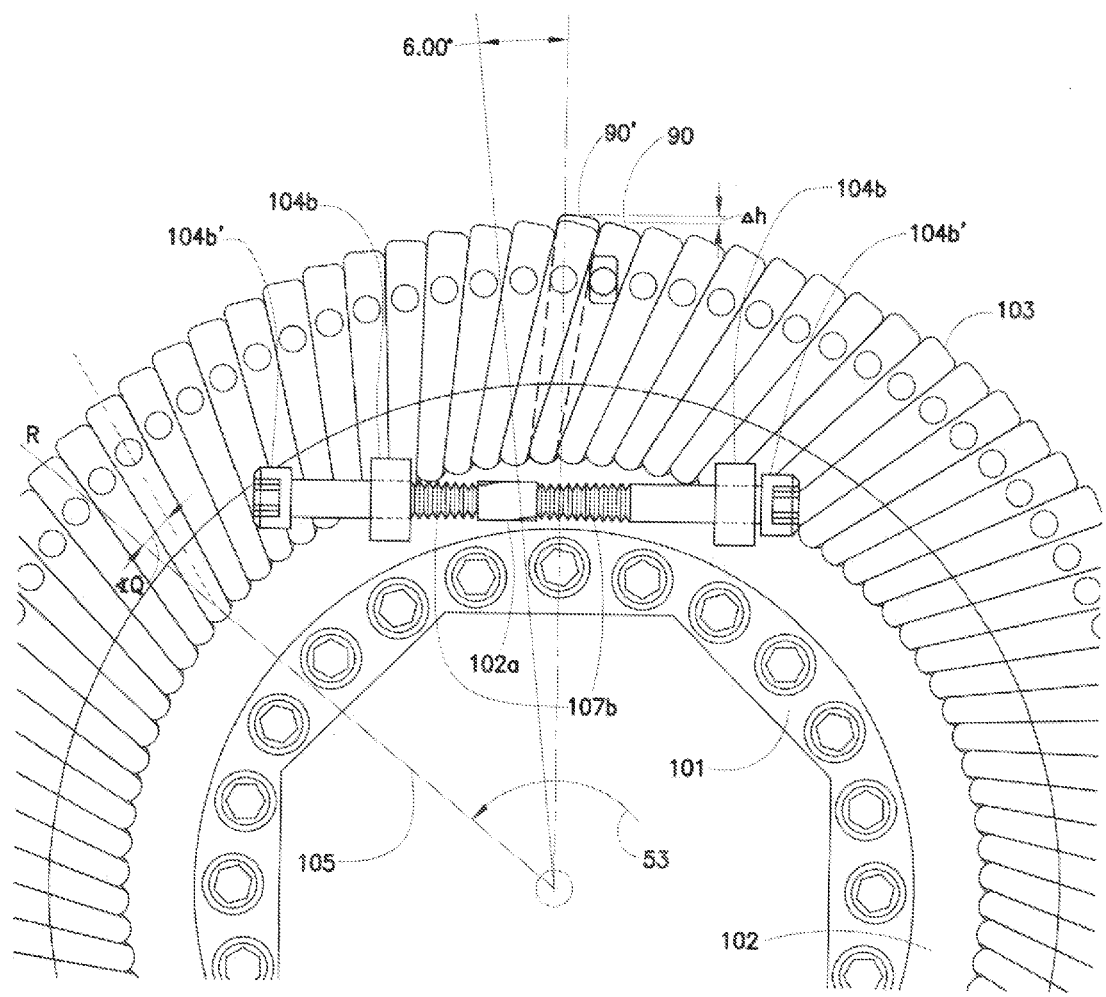
Figure 4A:
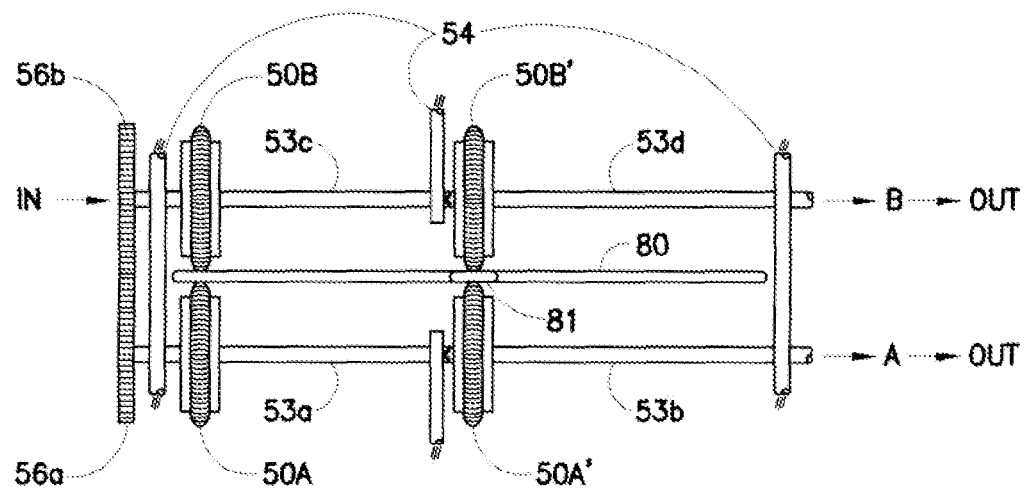
Figure 4:
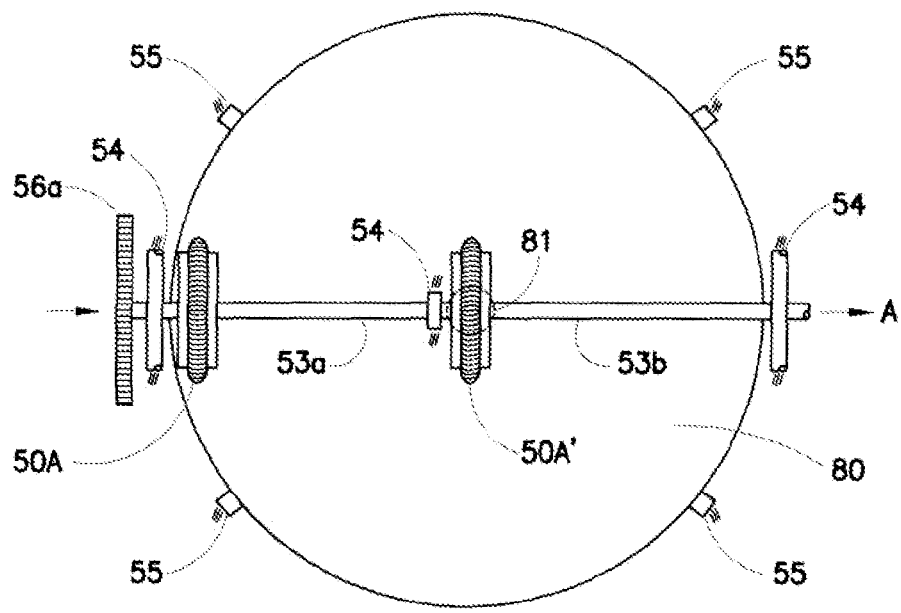

FIG. 1 shows a prospective view of the locking lug
FIG. 1A shows an Embodiment of a continuously-variable transmission
FIG. 2 is an exploded view of the Torque Transfer Unit—TTU
FIG. 3 is a close up view of two opposing TTUs gripping an object between them
FIG. 3a depicts positioning, and cushioning, of indexing plate 102
FIGS. 4 and 4a show a top and side view of a transmission using a flat torque transfer disc
FIG. 5 shows a cross section of a hemispherical transmission
FIGS. 6a and 6 show a perspective and side view cross section view of the simplest version
FIG. 7 shows a shaft of the transmission
FIG. 8 is a side view cross section of a nested version
FIGS. 9(a)-9(d) show prior art torque transfer methods.
FIGS. 9(e)-9(h) show examples of geometries of driven/driver surfaces relationship for certain of the present embodiments.

REFERENCE NUMERALS

Q angle of lean between a radius R and the center line of lug 90
F force exerted by the TTU discs 100 and 104 on shoulders 91 of lug 90
2 input shaft
3 driving hemisphere
4 output shaft
5 control arm
6 TTU
8,9,11,12 gears
10 shaft
13 free wheeling disc
14 handle
15 support or gear box 20 cone
21 shaft
23 support
24 freewheel
25 TTU
26 threads
27 support
28 TTU carrying shaft
29 output shaft
30,31,32,33 gears
50 TTU
53 TTU shaft
54,55 supports
56 gears
80 driven disc or object
90 lug
91 lug arms
100 rear TTU disc
100a radial driving slots
101 TTU spacer
102 indexing ring
102a index ring tabs
103 lugs assembly
104 front TTU disc
104b index adjust slot and screw mount
104b' indexing adjust screw
105 TTU bolting screws
106 bearing
106a bearing retainer ring
107 holes for bolting screws
107b indexing adjust springs

FIRST EMBODIMENT

Description—FIGS. 1-3a

Sketch (f) on page Dwg 1 illustrates the concept used in this invention.

FIG. 1 depicts a lug 90, which has integral horizontal shoulders 91 placed near its head.

FIG. 1A depicts schematically for orientation purposes any engine in which the flywheel was replaced by a reasonably shallow cone of the same inertial value as the flywheel had. The cone 20 (made transparent), has a TTU 25 in contact with its inner, curved, surface; the output shaft 28 on which TTU 25 is mounted completes this simple, light, appx 5 to 1 ratio transmission. (Supports for the output shaft 28, and the shifting mechanism (cable, screw, rod, or?) for relocating TTU 25 along shaft 28 not shown.

FIGS. 2, 3, and 3a illustrate and teach how a torque transmission unit (later also referred to as "TTU") is constructed to utilize lugs 90 in creating a momentary lock to the disc being driven:

Driver disk 100 has an elongated body with a geometric axial center cut to match the shape of the shaft 53 which will be driving the TTU. Holes 107 for assembly screws 105 are predrilled in driver disc 100, (as they are in parts 101 and 104);

Spacer 101 is aligned with driver disc 100 and screws 105 are inserted thru both.

The indexing ring 102 is placed rotationally on spacer 101, with the indexing tab 102a on the indexing ring 102 placed in the center of indexing slot 100b within the driver disc 100, and being held in that center by screw 107a;

Next, a full circular complement of lugs 90 is placed on the indexing ring 102 in a radial orientation: the bottom of each lug is placed in the curved seat waiting for it on the indexing ring 102, and one shoulder 91 is located in the radial slot 100a cut into the driving ring 100.

Now driving disc 104 is slipped onto screws 105, orienting slot 104b to accept the indexing tab 102a in its center, with the still free second shoulders 91 of the lugs 90 fitting into the radial slots identical to 100a on the back of driver disc 104 (not visible in this orientation).

IN OPERATION: The assembly screws 105 are now tightened; the clearances are such that the indexing ring 102 will be indexed a segment in either direction as commanded by the screws 104b' in the indexing slots 100b and 104b; that movement relocates the bottom of each lug in relation to their shoulders 91, which are held in the radial slots 100a—and determines the angle at which each lug will approach the load to be gripped. Please see FIGS. 3 and 3a for further details.
FIGS. 3,3A Two TTUs are gripping the disc 80; each is driven as indicated by arrows by its own shaft 53, the shafts are synchronized;

IN OPERATION: driving discs 100 and 104 exert, thru the wall of radial slots 100a, the force F on the lugs of shoulders 90. The lugs are therefore urged to rotate to a less inclined—more straight radial position—in their seats in the indexing ring 102, and that movement forces their tops into a greater interference with the material of disc 80. The closer to the radial orientation lug 90 is forced, the greater the "wedging effect", in which the force between the top of the lug 90, and the point on disc 80 it is contacting, grows materially—soon reaching a value at which the coefficient of friction between the materials of lug 90 and disc 80 would alone be sufficient to establish a no slip (locked) relationship. Additionally however, in this design, lug 90 is urged to rotate in its seat in ring 102 by the driving discs 100 and 104 and so be on an interference path with disc 80. This creates a self controlling force level between the two: lug 90 (pushed by the driving input force), must displace the material of disc 80 it finds before it, or fracture would occur.

If the load on disc 80 is moderate, pure friction between it and lug 90 would cause the disc 80 to rotate; if the load on disc 80 grows, its resistance to lug 90 causes the driving forces to jam the lug 90 into a fully locked position, and motion of the disc 80 becomes inevitable.

The "lean angle Q" is the angle at which the lugs 90 are inclined away from a radius R, which starts from the center of shaft 53, and passes thru the bottom of the lug 90. If angle Q is proper. (please see also FIG. 3a), a lock between the lugs 90 and disc 80 is created, and the rotation of disc 80 is inevitable if no fractures are to occur. The action is more akin to one gear's tooth pushing the material in its way—its mating gear's tooth, out of the way—and quite different from the prior art.

Indexing ring 102 can be made to possess a "give" capability, by having compressible characteristics, so that when sudden or excessive loads occur, the lugs 90 can reduce the level of their relentless demands on disc 80 to move, and parts damage is avoided. Note: proper alloy and heat treatment selection is essential for good operation and low wear in this design; attention should be given to substrata strengths, so that surface hardness does not become merely a skin over unsupportive underlay.

When the disc 80 wants to move faster, because the load speed overruns the rotational speed of the TTUs, or the disc 80 is the driver and TTUs are the driven for any other reason, it is disk 80 that first—via friction against the tops of lugs 90—urges the lugs 90 to "stand up", to assume a more radial orientation; in next instant, a rolling action between the top of lug 90 and disc 80, traps the lug nearly vertically between the indexing hub 102 in which the bottom of the lugs are held, and disc 80; as a result the force between the lug 90 and disc 80 increases materially—and in next instant a wedging has occurred, locking lug 90 and disc 80 together and causing the locked point of disc 80 have the same rate of motion as the top of lug 90 held by the TTU, which causes a firm rotation of the TTUs by the disc 80.

FIG. 3a shows also one way in which the lugs 90 are given more capability to self regulate the magnitude of the force they will generate at the contact point with the object to be driven.

Springs 107b, which can be placed on both sides of the index ring tab 102a, and compressed or released by actions of screws 104b'; said springs 107b can be set manually, or controlled during operation by any of the means which will occur to those skilled in the art; if the clearance between the incoming (thru rotation of shaft 53) lug 90 and disc 80 is larger than it should be, spring 107b will urge the indexing ring 102 to move slightly clockwise, thus—in combination with force F—urges lug 90 toward a position indicated as 90'. This counterclockwise rotation attempt of lug 90 in its seat of indexing plate 102 elevates said head by "delta h" shown, and brings the said head of lug 90 into the desired gripping position against disc 80.

FIG. 4—This embodiment is also single input/dual output capable. The view of the disk 80 in FIG. 4 would be the same if that disc was flat, or a concave cone . . . . Our gripping capability thru TTUs 50 lugs 90 makes it possible to consider using just a plain flat disk instead the concave form for better contact. Longevity and other future tests, and the type of use intended will determine the end preference. We are using a flat disk here because equal and opposite forces—by one TTU on each side of that disc—are exerted upon it in this design.

Still, the view in FIG. 4 permits us to examine it as if we were presenting a standalone transmission version, without the presence or consideration of what is on the other side:

Disk 80 is rotatably held in supports 55. A small freewheeling disc 81 is part of its surface at the very center. TTU 50A'—mounted slideably on shaft 53b is shown in contact with the freewheeling disc 81. Shaft 53b, which is coaxial with shaft 53a, has a smaller end rotatably inserted into shaft 53a, with both shafts supported by bearings 54.

IN OPERATION: When rotational input is delivered to shaft 53a—either thru gear 56a or directly—TTU 50A begins to rotate disk 80; the freewheeling disc 81 isolates the output generating TTU 50A' there is no rotation of shaft 53b, and the transmission is in Neutral.

We have freedom of choice of how to generate output: we can now move TTU 50A' slowly to the right, toward the outer limit of disc 80, (this would give us the maximum torque start) and then move TTU 50A as far as it will go toward the center of disk 80; or we can floor the accelerator by moving both TTUs, 50A' and 50A, swiftly to the right. If the engine is strong enough, and we already have it at max rpm or torque point, slamming our TTUs from minimum engagement to extreme should give us probably tin-paralleled acceleration.

Looking now at FIG. 4A, we recognize that while having the opposing TTU pairs (50A' & 50B', and 50A & 50B) always aligned opposite each other gives us equal and opposite loads, we can also use a bit stronger disk 80, and operate the lower TTUs (50A & 50A) independently—placing them in different locations from the upper pair (50B & 50B), which would give us ONE engine with TWO different drive outputs: in marine use we could drive two propellers at different speeds using one power source; in land vehicles drive left and right wheels differently when of advantage, and have endless agri and construction machinery applications for both wheels and accessories. Or we can leave shafts 53a and 53b as they are now shown, and utilize the open space on disc 80 (best seen in FIG. 4) to add—at other angles—one or more shafts with TTUs, though functioning on only a part of disc 80s surface, to obtain other rpm and torque capabilities as separate outputs.

ANOTHER EMBODIMENT

FIGS. 6, 6a

FIG. 6 is essentially the same concept, using a deeper cone 20 for grater curvature and therefore larger contact: area between the lugs of TTU 25 and the cone 20.

IN OPERATION: In FIG. 6 the input shaft 21 is rotating cone 20. Frame 23 reaches into the apex of cone 20 to provide sturdy support for the end of shaft 28 which it holds rotationally; the lower end of shaft 28 is rotationally supported by gear box 27. A cross section of shaft 28 in FIG. 7 indicates that it is broached, 28', and threaded, 26'; lugs 90 are carried by TTU 25 which is mounted on shaft 28; said TTU is positionable up and down shaft 28 by the nut and lock 26, which are rotationably mounted on TTU 25, and engaged with the threads 26 upon shaft 28. (Means for rotation of nut and lock 26 not shown, but any can be used) When TTU 25 is in its highest location, it engages a freewheeling shield 24 which is rotationally held in the very apex of cone 20, and isolates the TTU in this highest position from any motion of said cone. As TTU 25 is moved by the nut 26 to any lower position on shaft 28, the rotating inner cone 20 surface is momentarily LOCKED thru the lugs to TTU 25, thereby rotating shaft 28 and thru it the output shaft 29. Additional assemblies like shaft 28 and TTU 25 can be added—both internally and externally to cone 20, as space permits—and not all must reach as high as the apex . . . . Activating means for positioner nut 26 are not shown, but can be any of the variety of means which will occur to those skilled in the art FIG. 8 is an extension of the concept carried in FIGS. 6a, and 6:

The configuration shown here can be used if higher output speeds or still wider gear ranges are sought. To the cone 20 of FIG. 8 a smaller size twin of it was added, cone 20', by NESTING it inside cone 20.

It is independently rotationally supported, by frame members 27 which correspond to supports 23 of cone 20.

IN OPERATION: As TTU 25 leaves the NEUTRAL position in shield 24 which is freewheeling in the apex of cone 20 and moves downward, the rotation of shaft 28 is transmitted thru gears 30 and 31 to the shaft 28' inside the nested cone 20'; TTU 25' then rotates cone 20'; ring gear 33—which is the lowest (largest circumference) of cone 20'; that action turns gear 32, which produces rotation of output shaft 29.

When TTU 25 in cone 20 reaches its bottom (max speed) position, shadowed in as 25"—TTU 25' can be advanced upward within cone 20', to add the nested cone's capabilities to the output.

The ratio of gears 30 & 31, and 33 & 32 to each other gives the designer another degree of freedom—whatever suits best his desires hr output characteristics.

ALTERNATIVE EMBODIMENT

FIG. 5

The input shaft 2 is rotating a just short of being a hemisphere dome 3; the output shaft 4 has its center line located on the diameter of what would have been the full hemisphere.

IN OPERATION: The driven TTU 6, carrying lugs 7 for LOCKING with the inner surface of the dome 3, has a gear 8 as part of its surface; rotation of gear 8 rotates—thru gear 9, shaft 10, and gear 11, the output shaft mounted gear 12; box 15 can be either just support for output shaft 4, or a differential or other gear box.

In the shown position, TTU 6 rests against the freewheeling disc 13 mounted at the epicenter the interior of dome 3; it is therefore not influenced by the rotation of dome 3, and the output shaft remains stationary regardless of the behavior of the input shaft: the transmission is in NEUTRAL.

Movement of control handle 14 activates the transmission: if lifted toward the reader ("out of the paper") it rotates arm 5 with it the entire assembly—from gear 11 to TTU 6—into contact by the TTU 6 with the desired cord location of dome 3, so determining the desired rotational output speed of (via the lugs on TTU 6) of the output shaft 4.

CONCLUSIONS, RAMIFICATIONS, AND SCOPE

The acknowledged need, and aggressive search, for useable infinitely variable transmissions has existed for decades. We believe that the need will only increase, and that most energy efficient vehicles, general power trains, as well as the electricity harvesting Wind Turbines will in the future have to go to some form of infinite variability in their gearing.

Our effort is to provide non slip operation, and higher levels of transmitted forces, in the hope that these advances will permit a higher penetration of infinitely variable power trains into general use.

Aside from other benefits: if that penetration were to demonstrate conclusively that the expected fuel savings—automatically accompanied by less pollution and lower warming effects—are truly attainable, the current gallop toward hybrid mobile units will likely at least slow down. The now ignored voices, pointing out that the disposal of the batteries and associated remnants of that massive fleet, will cause more, and worse, pollution headaches then those it is claimed will be eliminated—will perhaps find the hearing they always deserved. This could create a more open attitude toward simpler, more effective solutions.

The invention claimed is:

1. A continuously-variable transmission comprising:
  a driven member configured to receive a force to cause rotary motion of the driven member; and
  a driver roller configured to impart the force to cause rotary motion of the driven member, the drive roller movable relative to the driven member to continuously vary the speed of the rotary motion of the driven member, the driver roller including:
    a plurality of movable contact members each having an inner end configured to contact the driver roller, an outer end configured to contact the driven member;
    a plurality of rigid force delivery members extending laterally outward from opposing sides of each of the plurality of movable contact members, the force delivery members configured to transfer force from the driver roller to the plurality of movable contact members, and to operate the plurality of movable contact members to:
      position the outer ends of the movable contact members in contact with the driven member while the inner ends of the movable contact members are in contact with the driver roller;
      orient the contact members into self-locking positions such that the contact members lock the driver roller and driven members together; and
    an indexing ring movably coupled to the driver roller and in contact with the inner ends of the movable contact members to adjust the angle at which the plurality of movable contact members approach the driven member.

2. The variable transmission of claim 1, further comprising:
  an input shaft configured to deliver torque to the driver roller, wherein the driver roller is slideably mounted on the input shaft; and
  relocation means configured to adjust the position of the driver roller along the length of the shaft;
  wherein adjusting the position of the driver roller along the length of the shaft shifts the contact diameter between the driver roller and the driven member.

3. The variable transmission of claim 1, wherein the driven member includes a flat rotationally mounted disc.

4. The variable transmission of claim 1, in which the driver roller is rotated by a second driver roller.

5. The variable transmission of claim 1, further comprising a second driver roller:
  in contact with the driven member; and
  configured to be rotated by the driven member.

6. The variable transmission of claim 1, where the indexing ring is configured to be disposed around a rotational axis of the driver roller, the indexing ring having an outer surface configured to contact the contact members, the outer surface having a first point that is a first radial distance from the rotational axis and a second point that is a second radial distance from the rotational axis, and the second radial distance is larger than the first radial distance.

7. A continuously-variable transmission comprising:
  a driven member configured to receive rotary motion; and
  a driver roller configured to impart rotary motion to the driven member, the drive roller movable relative to the driven member to continuously vary the speed of the rotary motion of the driven member, the driver roller including:
    a plurality of movable contact members configured to contact the driver roller and the driven member;
    a plurality of force delivery members configured to operate the plurality of movable contact members-to:
      position the movable contact members in contact with the driver roller and the driven member;
      orient the contact members into self-locking positions such that the contact members lock the driver roller and driven members together;
  a second driver roller:
    in contact with the driven member; and
    configured to be rotated by the driven member; and
  wherein the second driver roller is on the opposite side of the driven member relative to the driver roller.

8. The variable transmission of claim 7, wherein the distance from the center of the driven member to the driver roller is different than the distance from the center of the driven member to the second driver roller.

9. A continuously-variable transmission comprising:
  a driven member configured to receive rotary motion; and
  a driver roller configured to impart rotary motion to the driven member, the drive roller movable relative to the driven member to continuously vary the speed of the rotary motion of the driven member, the driver roller including:
    a plurality of movable contact members each configured to contact the driver roller and the driven member;
    a plurality of force delivery members configured to operate the plurality of movable contact members-to:

position the movable contact members in contact with the driver roller and the driven member;

orient the contact members into self-locking positions such that the contact members lock the driver roller and driven members together;

an indexing ring configured to be disposed around a rotational axis of the driver roller, the indexing ring having an outer surface configured to contact the contact members, the outer surface having a first point that is a first distance from the rotational axis and a second point that is a second distance from the rotational axis, and the second distance is larger than the first distance; and where the outer surface of the indexing ring includes a plurality of concave curved seats.

10. The variable transmission of claim 9, where driver roller is configured such that the indexing ring automatically urges the plurality of movable contact members toward the driven member.

11. The variable transmission of claim 10, further comprising:

one or more springs coupled to the driving roller and to the indexing ring to automatically urge the plurality of movable contact members toward the driven member.

\* \* \* \* \*

UNITED STATES PATENT AND TRADEMARK OFFICE
CERTIFICATE OF CORRECTION

| | |
|---|---|
| PATENT NO. | : 8,419,589 B1 |
| APPLICATION NO. | : 12/475277 |
| DATED | : April 16, 2013 |
| INVENTOR(S) | : Brown et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this
Thirtieth Day of December, 2014

Michelle K. Lee
*Deputy Director of the United States Patent and Trademark Office*